Dec. 27, 1927.
A. E. GRIMES
1,654,372
INCUBATOR
Filed Feb. 9, 1926
4 Sheets-Sheet 1
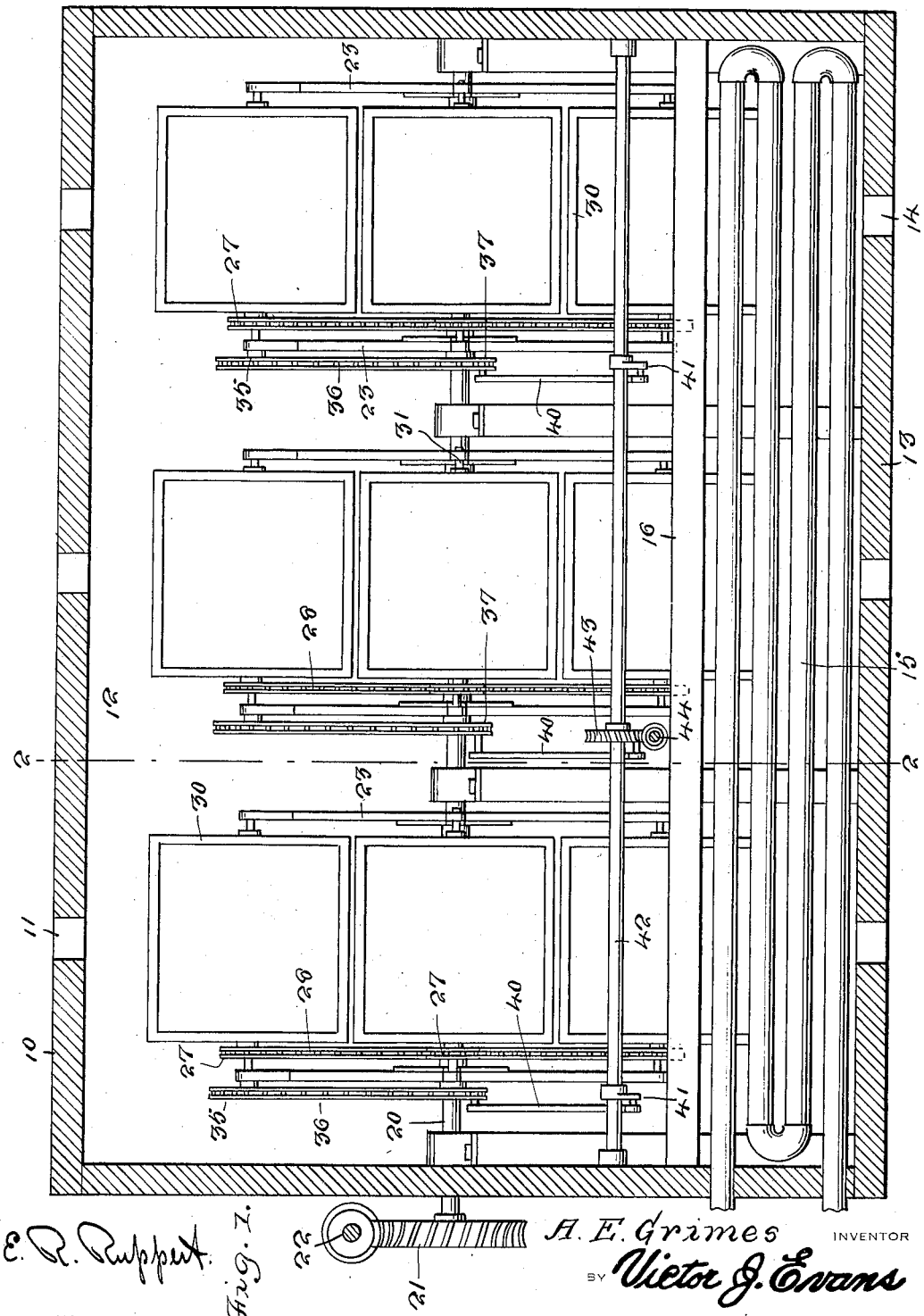

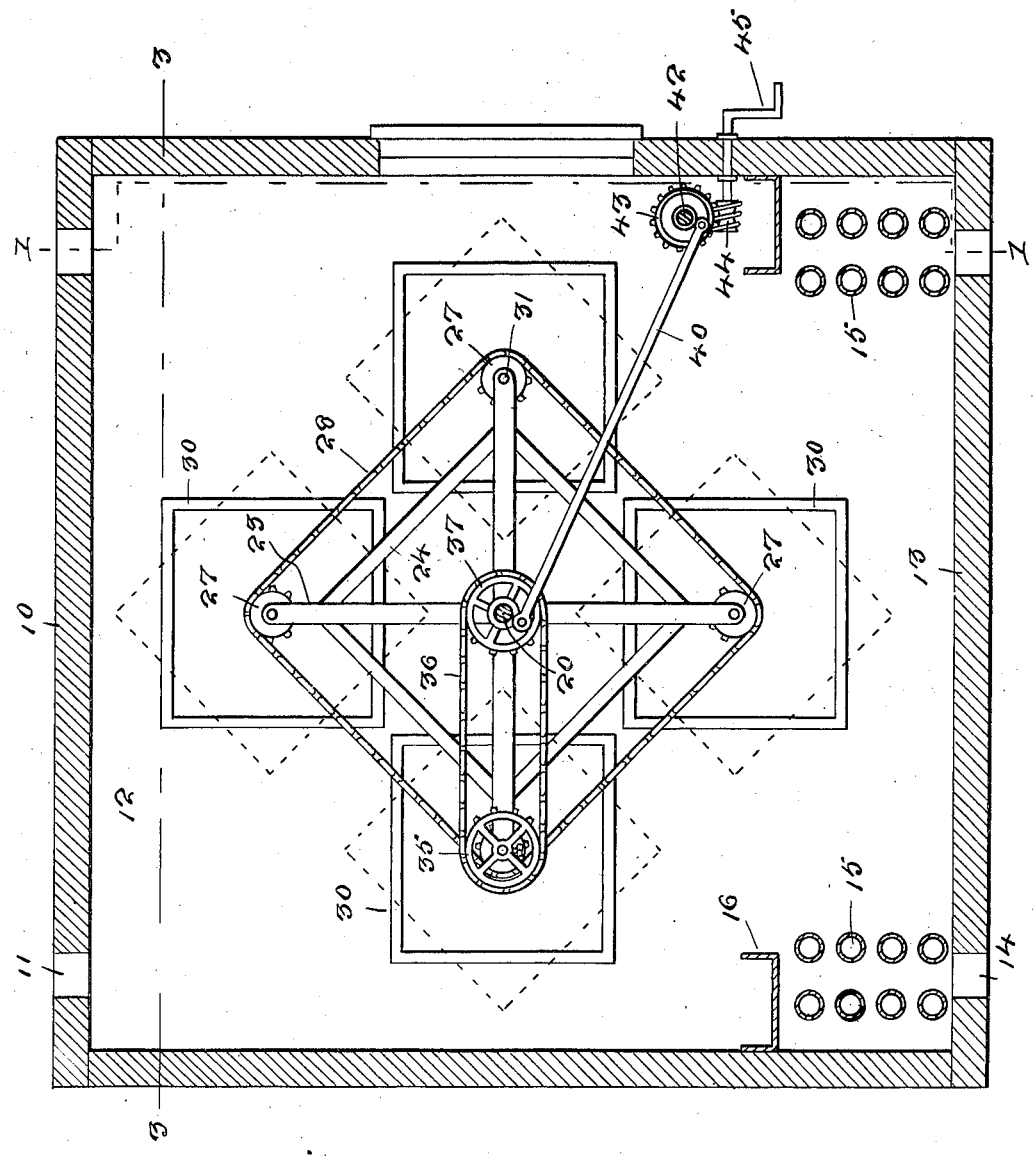

Dec. 27, 1927.
A. E. GRIMES
1,654,372
INCUBATOR
Filed Feb. 9, 1926　　4 Sheets-Sheet 3
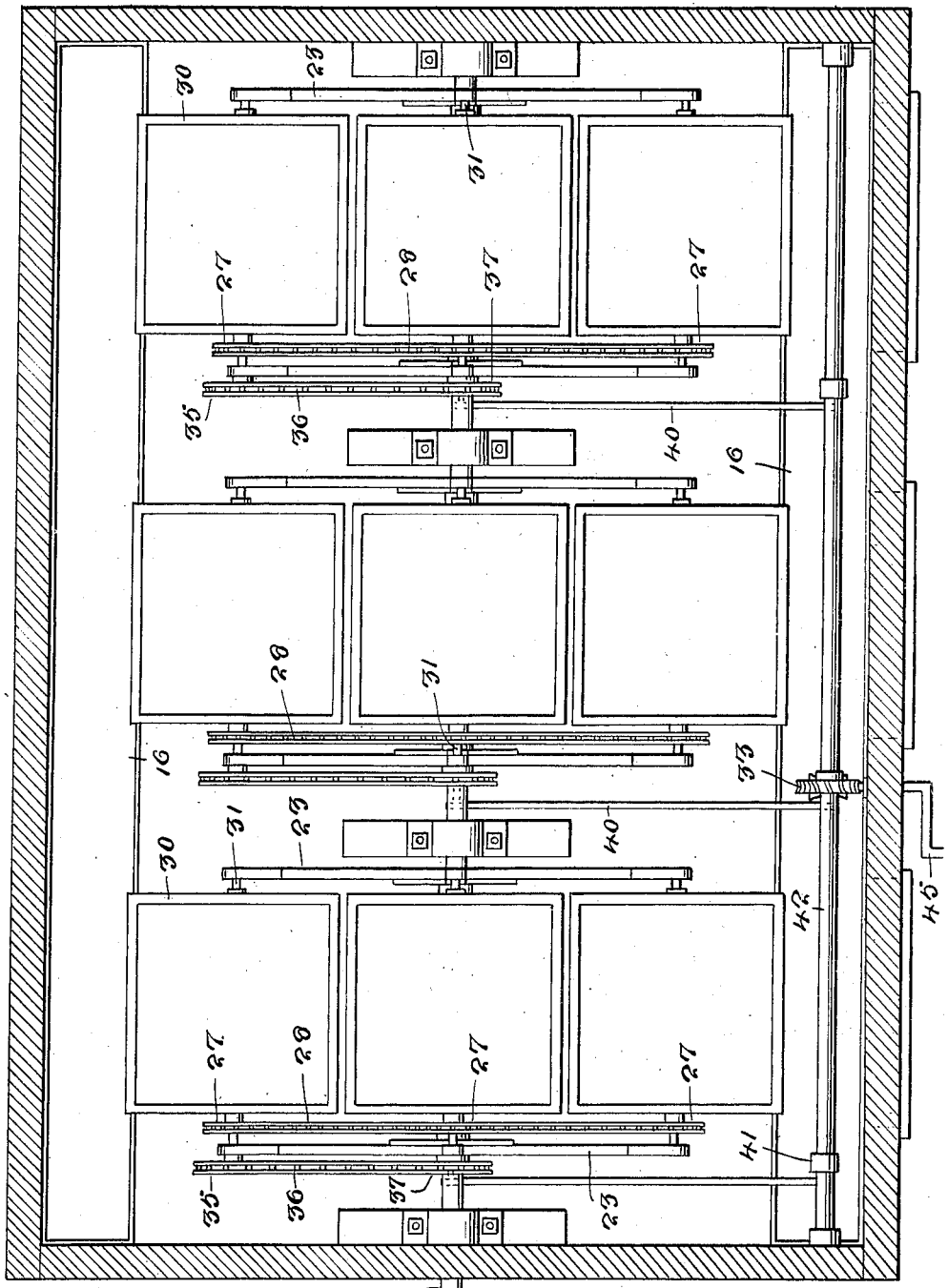

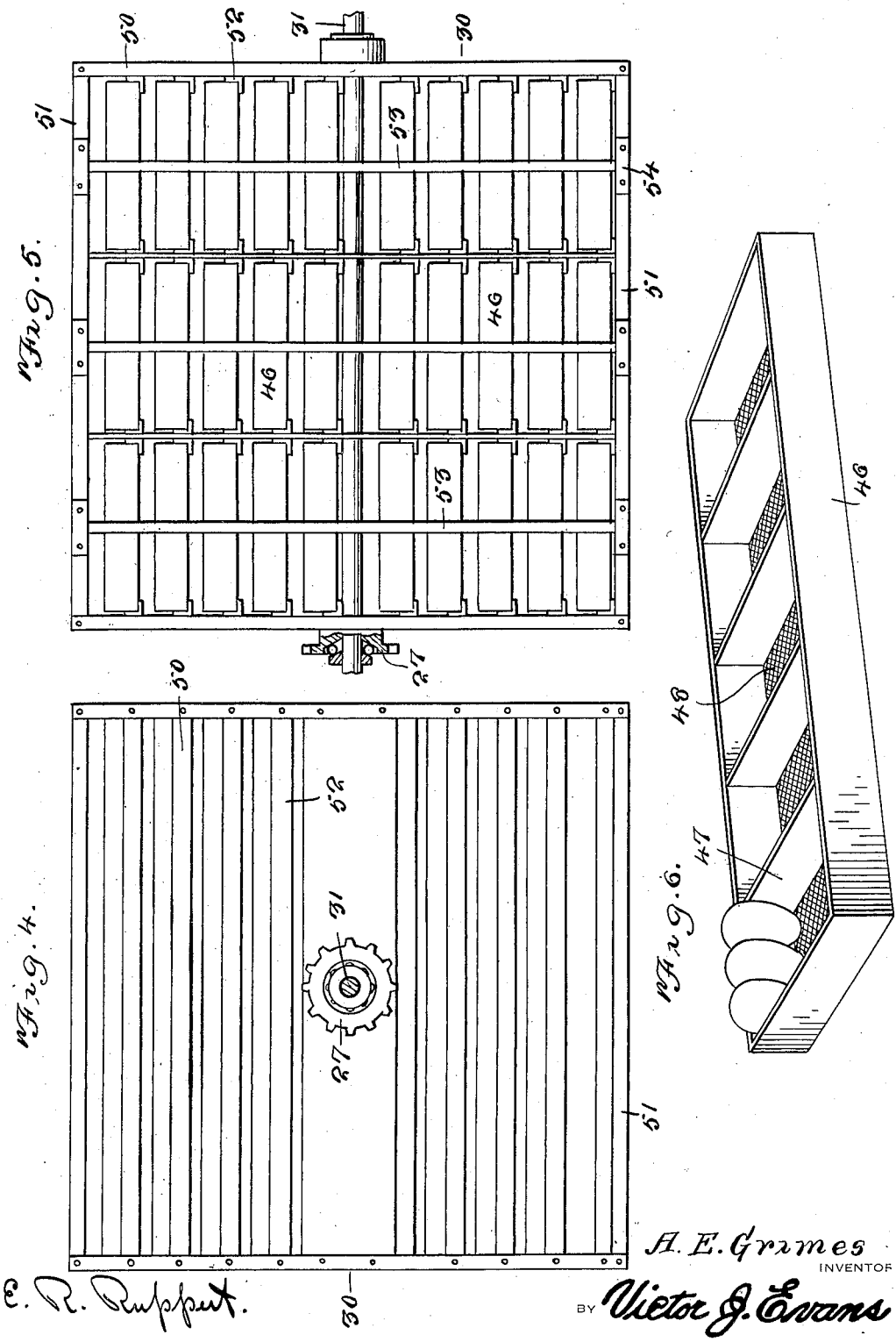

Patented Dec. 27, 1927.

1,654,372

UNITED STATES PATENT OFFICE.

ARCHIE E. GRIMES, OF DECATUR, OHIO.

INCUBATOR.

Application filed February 9, 1926. Serial No. 87,131.

The object of this invention is to provide an incubator designed to contain several thousands of eggs to be carried in trays mounted in racks, several of these racks being assembled in a rotatable frame and so connected with operative mechanism that they may all be tilted at one time.

A further object is to provide for tilting the racks in a plurality of frames simultaneously, any one of the frames, and particularly the hatching frame, being adapted to be disconnected from the tilting means.

A further object is to provide for securing a suitable and uniform temperature by the movement of the air through the main chamber and by the rotation of all of the frames carrying egg racks and egg trays, said frames being carried by a main shaft to which rotary movement is imparted by any suitable means.

With the foregoing and other objects in view, the invention consists in the novel construction and arrangement of elements described, illustrated and claimed, it being understood that modifications may be made within the scope of the claims, without departing from the spirit of the invention.

In the drawings forming part of this application,

Figure 1 is a view on line 1—1 of Figure 2, the housing being shown in vertical section and the interior structure in elevation.

Figure 2 is a vertical section on line 2—2 of Figure 1.

Figure 3 is a horizontal section on line 3—3 of Figure 2.

Figures 4 and 5 are views in elevation, showing an egg rack, the view appearing in Figure 5 showing the device as viewed from a different angle, as compared with the showing of Figure 4.

Figure 6 is a perspective view of one of the egg trays.

The housing includes the top 10 provided with opening 11 through which air passes from the main chamber 12, and the bottom 13 is provided with opening 14 through which air enters below and between the heating coils or pipes 15, a duct or trough 16 being mounted above each coil or series of pipes 15.

A main shaft 20 extends longitudinally through the housing, and carries a worm wheel 21 to which movement is imparted by worm shaft 22. Carried by shaft 20 are frames 23, shown in edge elevation in Figure 3, and in side elevation in Figure 2, these frames including, if desired, the several elements there illustrated, the radial arms of the frames being strengthened by braces 24. Mounted at the outer ends of the radial arms of the frame 23 are sprocket wheels 27, and a chain 28 passes around the four sprocket wheels shown in Figure 2, for imparting tilting movement to the egg rack 30 mounted respectively on shafts 31 carrying the aforesaid sprocket wheels 27. In Figure 2, all of these racks 30 are shown in full lines in horizontal position, and upon actuating the controlling means described below, all of the racks of that unit will be tilted to the desired angle, the dotted line position of Figure 2 indicating one adjusted position.

The frames 23 and the series of four racks carried thereby, constituting one unit, are rotatable upon the rotation of shaft 20, and the individual units, or rather the racks in the separate units, are adjusted by the movement of chain 28, as intimated. One of the shafts 31 carries a sprocket wheel 35 driven or partly rotated by chain 36 passing over sprocket wheel 37 loose on shaft 20.

A wheel 37 is provided for each unit, and these wheels are detachably connected by means of crank pins and rods 40 with crank arms 41 on rock shaft 42 extending the full length of the housing, and controlled by worm wheel 43 and worm shaft 44 to which motion is imparted by crank 45. Tilting movement in either direction may be imparted, and if the central unit comprising the four racks thereof is made use of for hatching purposes, the bar 40 may be disconnected, in order that the other racks mounted in the end units in the housing may be inclined at a suitable angle, and the racks of the middle unit be maintained in a horizontal position. The eggs are transferred from the regular racks to the hatching racks and trays after the first eighteen days, and the trays for the middle racks may be spaced further apart and provided with protecting devices to prevent the chicks from falling out. The hatching trays will have no partitions, but one of the egg trays for use in the regular rack is shown in Figure 6, and includes the main frame, the screen bottom, and the partition, there shown, the eggs being placed on end, whereas in the hatching trays the eggs will be placed in horizontal position. The tilting movement to an angle of about 45 degrees, in the regular racks and trays, prevents the developing embryo from sticking to one side of the shell. The trays of the regular type are designated 46, the partitions therein being shown at 47, and the bottoms being designated 48.

The racks of Figures 4 and 5 for the egg trays include the corner member 50, the transverse elements 51 and the angle bar supporting devices for the trays, designated 52. Retaining bars are shown at 53, these elements being detachable and having their ends mounted in any suitable holding devices 54. In connection with the trays, it may be noted that the ends of the hatching trays will be higher than those of the egg trays, used prior to the hatching period, for preventing the chicks from jumping out.

One of the heating coils is shown in elevation in Figure 1 and is designated 15, and air entering at the bottom through the openings 14 passes around the coils, water in the troughs 16 above the coils providing sufficient moisture. The air from the main chamber 12 passes out through upper opening 11, as previously indicated, and the movement imparted to the several units within the chamber serves to equalize the temperature conditions, so that no group of eggs will remain in any portion of the chamber becoming more highly heated than another portion thereof.

Having thus described the invention, what is claimed as new, is:—

1. In a device of the class described, a housing, a main shaft mounted therein, frames carried by the shaft and rotatable therewith, egg racks mounted in the frames, and devices for tilting all of the racks at one time, independently of the main shaft.

2. In a device of the class described, a housing, a main shaft mounted therein, frames carried by the shaft and rotatable therewith, egg racks mounted in the frames and devices including chain and sprocket mechanisms for tilting all of the racks at one time, independently of the main shaft.

3. In a device of the class described, a housing, a main shaft mounted therein frames carried by the shaft and rotatable therewith, egg racks mounted in the frames, and devices including worm gearing and chain and sprocket mechanism for tilting all of the racks at one time, independently of the main shaft.

4. In a device of the class described, a housing, a main shaft mounted therein, frames carried by the shaft and rotatable therewith, egg racks mounted in the frames, and devices for tilting all of the racks at one time, independently of the main shaft, said devices being operable for tilting some of the racks independently of the remaining rack.

5. In a device of the class described, a housing, a main shaft mounted therein, frames carried by the shaft and rotatable therewith, means for rotating the shaft, egg racks rotatable in the frames, axial elements for the racks, and a traveling member operatively connected with the axial elements and moving all of the racks in a frame at the same time.

6. In a device of the class described, a housing, a main shaft mounted therein, frames carried by the shaft and rotatable therewith, means for rotating the shaft, egg racks rotatable in the frames, axial elements for the racks, and a traveling member operatively connected with the axial elements and moving all of the racks in a frame at the same time, mechanisms for driving the traveling element, and means including a rock shaft for imparting limited movement to said mechanisms and to the axial elements of all of the frames, simultaneously.

7. In a device of the class described, a housing, a main shaft mounted therein, frames carried by the shaft and rotatable therewith, means for rotating the shaft, egg racks rotatable in the frames, axial elements for the racks, and a traveling member operatively connected with the axial elements and moving all of the racks in a frame at the same time, chain and sprocket mechanisms for driving the traveling element, and means including a rock shaft for imparting limited movement to said mechanisms and to the axial elements of all of the frames, simultaneously.

8. In a device of the class described, a housing having air openings in its upper and lower walls, heating means adjacent to the opening in the lower wall, a shaft extending horizontally through the housing near the central portion thereof, a plurality of egg carrying elements adjustable about individual axes and rotatable together in a circular path by the shaft, and mechanical means for simultaneously adjusting the angular position of these elements independently of the rotation of the shaft.

In testimony whereof I affix my signature.

ARCHIE E. GRIMES.